(12) United States Patent
Xiao

(10) Patent No.: US 10,568,076 B2
(45) Date of Patent: Feb. 18, 2020

(54) METHOD AND APPARATUS FOR TRANSMITTING UPLINK CONTROL INFORMATION (UCI)

(71) Applicant: Huawei Technologies Co., Ltd., Shenzhen (CN)

(72) Inventor: Jiehua Xiao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/971,892

(22) Filed: May 4, 2018

(65) Prior Publication Data

US 2018/0255544 A1 Sep. 6, 2018

Related U.S. Application Data

(63) Continuation of application No. PCT/CN2015/094065, filed on Nov. 6, 2015.

(51) Int. Cl.
*H04W 72/04* (2009.01)
*H04L 1/18* (2006.01)
*H04L 5/00* (2006.01)

(52) U.S. Cl.
CPC ....... *H04W 72/0413* (2013.01); *H04L 1/1812* (2013.01); *H04L 5/001* (2013.01); *H04L 5/0053* (2013.01)

(58) Field of Classification Search
CPC ... H04L 1/0031; H04L 1/0026; H04L 1/0029; H04L 1/1812; H04L 5/001; H04L 5/0053; H04L 1/1671; H04W 72/0413
See application file for complete search history.

(56) References Cited

U.S. PATENT DOCUMENTS

2012/0087254 A1 4/2012 Yin et al.
2013/0258960 A1 10/2013 Chen et al.
(Continued)

FOREIGN PATENT DOCUMENTS

CA 2926378 A1 2/2014
CN 103684705 A 3/2014
(Continued)

OTHER PUBLICATIONS

"P-CSI feedback enhancements for CA with up to 32 CCs," 3GPP TSG-RAN WG1 Meeting #82bis, Malmo, Sweden, R1-155692, 3rd Generation Partnership Project, Valbonne, France (Oct. 5-9, 2015).
(Continued)

*Primary Examiner* — Brian D Nguyen
(74) *Attorney, Agent, or Firm* — Leydig, Voit & Mayer, Ltd.

(57) ABSTRACT

A method and an apparatus for transmitting uplink control information (UCI) are provided. The method comprises: determining a first quantity of bits of a to-be-transmitted HARQ; and transmitting the HARQ when it is determined that the first quantity of bits is less than a threshold and a sum of the first quantity of bits and a second quantity of bits is greater than the threshold. Therefore, the HARQ is directly transmitted when it is determined that the sum of the first quantity of bits and the second quantity of bits is greater than the threshold. Accordingly, a disadvantage of a low downlink throughput can be avoided.

18 Claims, 1 Drawing Sheet

---

100 — Determine a first quantity of bits of a to-be-transmitted HARQ

110 — Transmit the HARQ when it is determined that the first quantity of bits is less than or equal to a threshold and a sum of the first quantity of bits and a second quantity of bits is greater than the threshold, where the second quantity of bits is a quantity of bits of to-be-transmitted CSI

(56) References Cited

U.S. PATENT DOCUMENTS

| | | | |
|---|---|---|---|
| 2014/0036704 A1 | 2/2014 | Seunghee et al. | |
| 2014/0226612 A1* | 8/2014 | Kim | H04B 7/024 370/329 |
| 2014/0376424 A1 | 12/2014 | Seo et al. | |
| 2015/0043458 A1* | 2/2015 | Seo | H04L 1/0027 370/329 |
| 2015/0085750 A1* | 3/2015 | Zhang | H04L 1/0031 370/328 |
| 2015/0124736 A1* | 5/2015 | Ko | H04B 7/0626 370/329 |
| 2015/0223230 A1 | 8/2015 | Liang et al. | |
| 2015/0245345 A1 | 8/2015 | Gao et al. | |
| 2016/0381587 A1* | 12/2016 | Alexey | H04W 76/38 370/329 |
| 2017/0273070 A1* | 9/2017 | Yi | H04L 5/001 |
| 2017/0310441 A1* | 10/2017 | Wei | H04B 7/0626 |

FOREIGN PATENT DOCUMENTS

| | | |
|---|---|---|
| CN | 104660387 A | 5/2015 |
| JP | 2015512174 A | 4/2015 |
| JP | 2015516744 A | 6/2015 |
| JP | 2015527810 A | 9/2015 |
| JP | 2015529052 A | 10/2015 |

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP TS 36.213 V12.7.0, 3rd Generation Partnership Project, Valbonne, France (Sep. 2015).

Huawei et al.,"Open issues for simultaneous transmission of periodic CSI and HARQ-ACK on PUCCH format 3," 3GPP TSG RAN WGI Meeting #70bis, XP050661977 R1-124067, San Diego,USA, Oct. 8-12, 2012, 6 pp.

Catt, "UL UCI enhancement for P-CSI feedback," 3GPP TSG RAN WG1 Meeting #82bis, XP051039596 R1-155184, Malmö, Sweden, Oct. 5-9, 2015, 6 pp.

"Periodic CSI feedback enhancement for up to 32 CCs," 3GPP TSG RAN WG1 Meeting #82bis, R1-156099, Malmö, Sweden, pp. 1-3, 3rd Generation Partnership Project—Valbonne, France (Oct. 5-9, 2015).

* cited by examiner

METHOD AND APPARATUS FOR TRANSMITTING UPLINK CONTROL INFORMATION (UCI)

CROSS-REFERENCE TO RELATED APPLICATIONS

This application is a continuation of International Application No. PCT/CN2015/094065, filed on Nov. 6, 2015, the disclosure of which is hereby incorporated by reference in its entirety.

TECHNICAL FIELD

Embodiments of the present invention relate to the field of communications technologies, and in particular, to a method and an apparatus for transmitting uplink control information (UCI).

BACKGROUND

To meet requirements of a single-user peak rate and system capacity increase, a most direct method is to increase a transmission bandwidth of a system. Therefore, a CA (carrier aggregation) technology emerges. The CA technology aggregates two or more CCs (component carrier) to support a larger transmission bandwidth. A CC is also referred to as a serving cell. Currently, the standardized CA technology supports aggregation of a maximum of five carriers.

In an LTE-A (Long Term Evolution Advanced) system, a terminal device sends UCI on a PUCCH (physical uplink control channel) to support uplink and downlink data transmission. The UCI includes the following main information:
  SR (scheduling request): used by a terminal device to request an UL-SCH (uplink shared channel) resource from a base station;
  HARQ (hybrid automatic repeat request) ACK/NACK: used by a terminal device to perform HARQ acknowledgment on downlink data sent on a PDSCH (physical downlink shared channel), and briefly referred to as HARQ in this specification; and
  CSI (channel state information): used by a terminal device to notify a base station of downlink channel quality, to help the base station perform downlink scheduling, and including information such as a CQI (channel quality indicator), a PMI (precoding matrix indication), an RI (rank indication), or a PTI (precoding type indicator), where according to time characteristics of CSI that is sent, the CSI reporting is further classified into pCSI (periodic CSI reporting) and aCSI (aperiodic CSI reporting).

In the existing protocols, in a CA feature, a PUCCH is configured only for a PCell of a primary carrier to feed back UCI of a plurality of carriers. HARQ and CSI may be reported for each carrier. Therefore, in a CA scenario, HARQ and CSI information of a plurality of CCs need to be reported on a PUCCH in a subframe.

However, a conventional-art method for transmitting UCI has a disadvantage of a low downlink throughput.

SUMMARY

Embodiments of the present invention provide a method and an apparatus for transmitting uplink control information (UCI), to resolve an existing disadvantage of a low downlink throughput.

According to a first aspect, a method for transmitting uplink control information (UCI) is provided, including:
  determining a first quantity of bits of a to-be-transmitted hybrid automatic repeat request (HARQ); and
  transmitting the HARQ when it is determined that the first quantity of bits is less than a threshold and a sum of the first quantity of bits and a second quantity of bits is greater than the threshold, where the second quantity of bits is a quantity of bits of to-be-transmitted channel state information (CSI).

With reference to the first aspect, in a first possible implementation, the method further includes:
  calculating a first difference by subtracting the first quantity of bits from the threshold; and
  determining whether the first difference is less than the second quantity of bits, and if the first difference is less than the second quantity of bits, selecting target CSI from the to-be-transmitted CSI, and sending the target CSI; if the first difference is greater than or equal to the second quantity of bits, sending the to-be-transmitted CSI.

With reference to the first aspect, in a second possible implementation, the method further includes:
  when it is determined that the first quantity of bits is greater than the threshold, performing spatial bundling on the HARQ;
  determining a third quantity of bits of the spatially bundled HARQ;
  when it is determined that the third quantity of bits is less than the threshold, calculating a second difference by subtracting the third quantity of bits from the threshold; and
  determining whether the second difference is less than the second quantity of bits, and if the second difference is less than the second quantity of bits, selecting target CSI from the to-be-transmitted CSI, and sending the target CSI; if the second difference is greater than or equal to the second quantity of bits, sending the to-be-transmitted CSI, where the second quantity of bits is the quantity of bits of the to-be-transmitted CSI.

With reference to the first or second possible implementation of the first aspect, in a third possible implementation, the selecting target CSI from the to-be-transmitted CSI includes:
  determining a report type corresponding to each piece of CSI in the to-be-transmitted CSI;
  determining a priority of each piece of CSI according to a priority of the corresponding report type; and
  using the first N pieces of CSI of the CSI sorted by priority as the target CSI, where a sum of a quantity of bits of the first N pieces of CSI is less than or equal to the first difference, and a sum of a quantity of bits of the first N+1 pieces of CSI is greater than the first difference.

With reference to the third possible implementation of the first aspect, in a fourth possible implementation, the determining a priority of each piece of CSI according to a priority of the corresponding report type includes:
  if any two pieces of CSI in the to-be-transmitted CSI have a same priority in corresponding report types, determine priorities corresponding to the any two pieces of CSI according to a preset rule, or determine priorities corresponding to the any two pieces of CSI according to priorities of component carriers (CC) respectively corresponding to the any two pieces of CSI.

With reference to the third or fourth possible implementation of the first aspect, in a fifth possible implementation, the method further includes:

receiving a target CC selection instruction, and determining a target CC according to the target CC selection instruction; and the determining a report type corresponding to each piece of CSI in the to-be-transmitted CSI includes:

determining a report type corresponding to each piece of CSI in the target CC.

According to a second aspect, an apparatus for transmitting uplink control information (UCI) is provided, including:

a processing unit, configured to determine a first quantity of bits of a to-be-transmitted hybrid automatic repeat request (HARQ); where the processing unit is further configured to determine whether the first quantity of bits is less than a threshold, and a sum of the first quantity of bits and a second quantity of bits is greater than the threshold; and a sending unit, configured to transmit the HARQ when the processing unit determines that the first quantity of bits is less than the threshold and the sum of the first quantity of bits and the second quantity of bits is greater than the threshold, where the second quantity of bits is a quantity of bits of to-be-transmitted CSI.

With reference to the second aspect, in a first possible implementation, the processing unit is further configured to:

calculate a first difference by subtracting the first quantity of bits from the threshold; and determine whether the first difference is less than the second quantity of bits, and if the first difference is less than the second quantity of bits, select target CSI from the to-be-transmitted CSI; and the sending unit is further configured to send the target CSI when the processing unit determines that the first difference is less than the second quantity of bits; or send the to-be-transmitted CSI when the processing unit determines that the first difference is greater than or equal to the second quantity of bits.

With reference to the second aspect, in a second possible implementation, the processing unit is further configured to:

when it is determined that the first quantity of bits is greater than the threshold, perform spatial bundling on the HARQ;

determine a third quantity of bits of the spatially bundled HARQ;

when it is determined that the third quantity of bits is less than the threshold, calculate a second difference by subtracting the third quantity of bits from the threshold; and determine whether the second difference is less than the second quantity of bits, and if the second difference is less than the second quantity of bits, select target CSI from the to-be-transmitted CSI, where the second quantity of bits is the quantity of bits of the to-be-transmitted CSI; and the sending unit is further configured to send the target CSI when the processing unit determines that the second difference is less than the second quantity of bits; or send the to-be-transmitted CSI when the processing unit determines that the second difference is greater than or equal to the second quantity of bits.

With reference to the first or second possible implementation of the second aspect, in a third possible implementation, that the processing unit is configured to:

determine a report type corresponding to each piece of CSI in the to-be-transmitted CSI;

determine a priority of each piece of CSI according to a priority of the corresponding report type; and use the first N pieces of CSI of the CSI sorted by priority as the target CSI, where a sum of a quantity of bits of the first N pieces of CSI is less than or equal to the first difference, and a sum of a quantity of bits of the first N+1 pieces of CSI is greater than the first difference.

With reference to the third possible implementation of the second aspect, in a fourth possible implementation, that the processing unit is configured to:

if any two pieces of CSI in the to-be-transmitted CSI have a same priority in corresponding report types, determine priorities corresponding to the any two pieces of CSI according to a preset rule, or determine priorities corresponding to the any two pieces of CSI according to priorities of component carriers (CC) respectively corresponding to the any two pieces of CSI.

With reference to the third or fourth possible implementation of the second aspect, in a fifth possible implementation, the apparatus further includes a receiving unit, configured to receive a target CC selection instruction;

the processing unit is further configured to determine a target CC according to the target CC selection instruction; and that the processing unit is configured to:

determine a report type corresponding to each piece of CSI in the target CC.

The embodiments of the present invention provide a method and an apparatus for transmitting UCI. In this solution, the first quantity of bits of the to-be-transmitted HARQ is determined; and the HARQ is transmitted when it is determined that the first quantity of bits is less than the threshold and the sum of the first quantity of bits and the second quantity of bits is greater than the threshold. In this solution, the HARQ is directly transmitted when it is determined that the sum of the first quantity of bits and the second quantity of bits is greater than the threshold. Therefore, a disadvantage of a low downlink throughput can be avoided.

DESCRIPTION OF EMBODIMENTS

Figure 1:
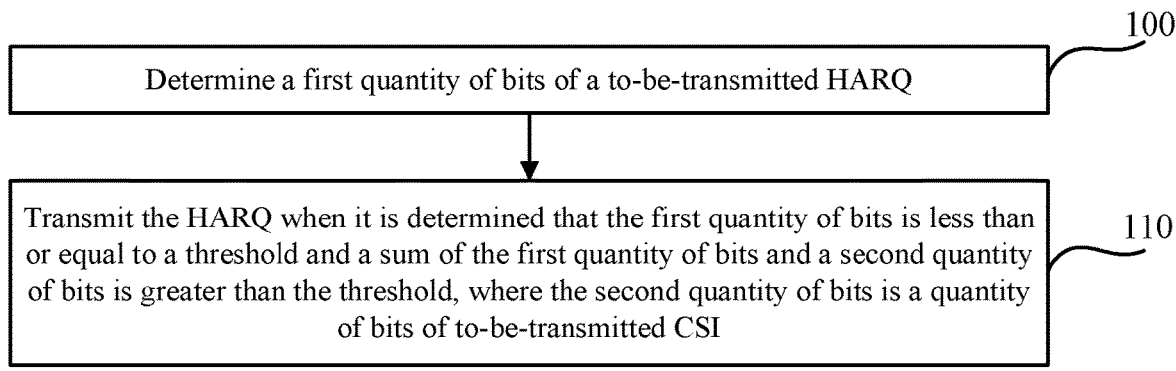
FIG. 1 is a flowchart for transmitting UCI according to an embodiment of the present invention.

To make the objectives, technical solutions, and advantages of the present invention clearer, the following further describes the present invention in detail with reference to the accompanying drawings. Apparently, the described embodiments are merely a part but not all of the embodiments of the present invention. All other embodiments obtained by a person of ordinary skill in the art based on the embodiments of the present invention without creative efforts shall fall within the protection scope of the present invention.

The following describes technologies used in the present invention.

HARQ Feedback Mechanism

HARQ feedback is required for the following types of downlink transmission:

1. Dynamic scheduling: One PDCCH (physical downlink control channel) corresponds to one PDSCH, and both are transmitted in a same downlink subframe.

2. SPS (semi-persistent scheduling): When SPS scheduling starts, a downlink SPS activation indication (SPS activation subframe) needs to be sent. When SPS stops, a downlink SPS release indication (SPS release subframe) needs to be sent. During SPS activation, a PDSCH is sent only on a specified resource, but there is no corresponding PDCCH (SPS subframe). HARQ feedback is required for the SPS activation subframe, the SPS release subframe, and the SPS subframe. When UE performs HARQ feedback, the UE may send the HARQ feedback on a PUSCH (physical uplink shared channel) or on a PUCCH. This specification is applicable to transmission on the PUCCH.

HARQ Spatial Bundling Mechanism

Spatial bundling, also referred to as HARQ multiplexing, is performing a logical AND operation on ACK/NACK corresponding to two code words sent by using a same downlink subframe of a same serving cell, to obtain 1-bit ACK/NACK information.

CSI Feedback Mechanism

CSI feedback is classified into periodic feedback and aperiodic feedback.

Periodically fed back CSI is referred to as pCSI, and aperiodically fed back CSI is referred to as aCSI. pCSI is usually sent on a PUCCH and aCSI is usually sent on a PUSCH.

Parameters of aCSI and pCSI include at least one of a wideband CQI, a subband CQI, a PMI (precoding matrix indication), a first/second PMI, a wideband PMI, an RI (rank indication), or a PTI (precoding type indicator).

Periodic feedback is also classified into different feedback modes, for example, a mode 1-1, a mode 1-0, a mode 2-1, and a mode 2-0. Parameters that need to be fed back in these modes are different. For example, in the mode 1-0, only wideband CSI needs to be fed back. In the mode 2-1, a subband CQI and a wideband PMI need to be fed back.

Reporting periods of different feedback parameters in periodic feedback may also be different. Details are not described herein.

Different CSI parameters or their combinations are defined as different report types, and different report types have different priorities. For example:

PUCCH reports may be classified into the following types:

Report type 1: UE-selected subband CQI feedback is supported;

Report type 1a: subband CQI feedback and second PMI feedback are supported;

Report type 2, 2b, and 2c: wideband CQI feedback and PMI feedback are supported;

Report type 2a: wideband PMI feedback is supported;

Report type 3: RI feedback is supported;

Report type 4: wideband CQI feedback is supported;

Report type 5: RI feedback and wideband PMI feedback are supported; and

Report type 6: RI feedback and PTI feedback are supported.

Different report types have different priorities. Different PUCCH report types are classified into two groups according to different priorities:

Group 1:

Report type group A: includes the report types 3, 5, 6, and 2a, which are high priorities; and Report type group B: includes the report types 1, 1a, 2, 2b, 2c, and 4, which are low priorities.

The priorities of the report type group B in group 1 may further be divided, for example, group 2:

Report type group C: includes the report types 2, 2b, 2c, and 4, which are high priorities; and Report type group D: includes the report types 1 and 1a, which are low priorities.

That is, when a CSI parameter in the report type group A conflicts with a CSI parameter in the report type group B in the group 1 (that is, when the CSI parameters need to be simultaneously transmitted and need to be selected), a priority of the CSI parameter in the report type group A is higher than a priority of the CSI parameter in the report type group B.

Similarly, when a CSI parameter in the report type group C conflicts with a CSI parameter in the report type group D in the group 2, a priority of the CSI parameter in the report type group C is higher than a priority of the CSI parameter in the report type group D.

A length of CSI (that is, a quantity of bits of the CSI parameter) varies in different conditions. For example, for the report type 2, the CSI parameter that needs to be fed back includes a wideband CQI and a second PMI. When a PUCCH reporting mode is set to 2-1 and RI=1, a length of CSI is 8 bits; when RI=4, a length of CSI is 10 bits.

To make the objectives, technical solutions, and advantages of the present invention clearer, the following further describes the present invention in detail with reference to the accompanying drawings. Apparently, the described embodiments are merely a part but not all of the embodiments of the present invention. All other embodiments obtained by a person of ordinary skill in the art based on the embodiments of the present invention without creative efforts shall fall within the protection scope of the present invention.

The following describes implementations of the present invention in detail with reference to the accompanying drawings. It should be understood that, the embodiments described herein are merely used to describe and explain the present invention, but are not intended to limit the present invention. In addition, the embodiments in this application and features in the embodiments may be mutually combined if they do not conflict with each other.

The following describes the embodiments of the present invention in detail with reference to accompanying drawings.

Referring to FIG. 1, a process of transmitting UCI in an embodiment of the present invention is as follows:

Step 100. Determine a first quantity of bits of a to-be-transmitted HARQ.

Step 110. Transmit the HARQ when it is determined that the first quantity of bits is less than or equal to a threshold and a sum of the first quantity of bits and a second quantity of bits is greater than the threshold, where the second quantity of bits is a quantity of bits of to-be-transmitted CSI.

Currently, when it is determined that the first quantity of bits is less than or equal to the threshold, and the sum of the first quantity of bits and the second quantity of bits is greater than the threshold, HARQ spatial bundling needs to be considered. However, when HARQ spatial bundling is performed, a downlink throughput decreases. CSI of a plurality of CCs may be transmitted on one subframe. Therefore, there is a high probability that HARQ spatial bundling is performed, and this may probably lead to downlink throughput decrease. In this solution, when it is determined that the first quantity of bits is less than or equal to the threshold, and the sum of the first quantity of bits and the second quantity of bits is greater than the threshold, HARQ is directly transmitted without considering HARQ spatial bundling. Therefore, a disadvantage of a low downlink throughput can be avoided.

It should be noted that, the threshold mentioned in this embodiment of the present invention may be a maximum capacity of any PUCCH format, or may be a maximum capacity of supported information corresponding to a specific resource. The threshold may be a predefined integer value, for example, a Kmax threshold defined for a PUCCH format 3 in the existing protocols. The threshold may be a threshold configured by a base station by means of higher layer signaling, RRC (radio resource control) signaling, or DCI (downlink control information). The present invention does not limit a threshold obtaining manner. For example, when a terminal device selects or the base station configures to use an RB (resource block) to perform simultaneous transmission of HARQ and CSI for a PUCCH format 4 resource, and specifies that a maximum information capacity of the resource is 100 bits, a threshold herein is 100 bits. For another example, if the terminal device selects or the base station configures to use the PUCCH format 3 for simultaneous transmission of HARQ and CSI, the threshold herein is Kmax.

In this embodiment of the present invention, there may be a plurality of manners of determining the first quantity of bits of the to-be-transmitted HARQ. Optionally, the following manner may be used:

determining in a semi-static manner according to a configuration of the base station, that is, determining according to a quantity of configured carriers and a sending mode of each configured carrier; or determining in a dynamic manner according to a configuration of the base station, that is, determining according to an actual scheduling status of each subframe or each group of subframes.

It should be noted that, if an SR needs to be simultaneously transmitted in a subframe for transmitting the HARQ, the first quantity of bits also includes a quantity of bits occupied by the SR.

In this embodiment of the present invention, the following manner may be used to determine the second quantity of bits of CSI:

calculating, according to a time configuration parameter of the base station for periodic CSI on each CC, a quantity of bits of CSI to be sent in a current frame.

A quantity of bits of CSI that does not need to be sent is zero. Therefore, the second quantity of bits is equal to a sum of a quantity of bits of CSI to be sent by each CC in the current frame, that is, the sum of the quantity of bits of CSI to be sent by all CCs is the second quantity of bits.

In this embodiment of the present invention, if the first quantity of bits is less than or equal to the threshold and the sum of the first quantity of bits and the second quantity of bits is greater than the threshold, there may be idle bits after only a HARQ is transmitted. In this case, the idle bits may be used to transmit CSI to improve resource utilization. Therefore, in this embodiment of the present invention, the method further includes the following operations:

calculating a first difference by subtracting the first quantity of bits from the threshold; and determining whether the first difference is less than the second quantity of bits, and if the first difference is less than the second quantity of bits, selecting target CSI from the to-be-transmitted CSI, and sending the target CSI; if the first difference is greater than or equal to the second quantity of bits, sending the to-be-transmitted CSI.

For example, the first quantity of bits of the to-be-transmitted HARQ is 230, the second quantity of bits of the to-be-transmitted CSI is 44, and the threshold is 256. Because the sum of the first quantity of bits and the second quantity of bits is greater than 256, when the HARQ is directly transmitted, a total quantity of bits is 256, the HARQ occupies 230, and there are 26 bits left. To avoid a waste of the 26 bits, the CSI may be transmitted over the 26 bits to improve resource utilization. The quantity of bits of the initially to-be-transmitted CSI is 44, greater than the quantity of idle bits. In this case, the target CSI needs to be selected from the initially to-be-transmitted CSI and transmitted.

The foregoing describes a situation in which the first quantity of bits is less than the threshold. In actual application, there may be a situation in which the first quantity of bits is greater than the threshold. In this case, HARQ spatial bundling is required and the bundled HARQ is transmitted. In this case, if a quantity of bits of the bundled HARQ is less than the threshold, there are still idle bits. To improve resource utilization, the idle bits may be used to transmit the CSI. Therefore, in this embodiment of the present invention, the method further includes the following operations:

when it is determined that the first quantity of bits is greater than the threshold, performing spatial bundling on the HARQ;

determining a third quantity of bits of the spatially bundled HARQ;

when it is determined that the third quantity of bits is less than the threshold, calculating a second difference by subtracting the third quantity of bits from the threshold; and determining whether the second difference is less than the second quantity of bits, and if the second difference is less than the second quantity of bits, selecting target CSI from the to-be-transmitted CSI, and sending the target CSI; if the second difference is greater than or equal to the second quantity of bits, sending the to-be-transmitted CSI, where the second quantity of bits is the quantity of bits of the to-be-transmitted CSI.

For example, the first quantity of bits of the to-be-transmitted HARQ is 400, the second quantity of bits of the to-be-transmitted CSI is 44, and the threshold is 256. Because the first quantity of bits is greater than 256, HARQ spatial bundling is performed. The quantity of bits of the bundled HARQ is 230, and there are 26 bits left. To avoid a waste of the 26 bits, the CSI may be transmitted over the 26 bits to improve resource utilization. The quantity of bits of the initially to-be-transmitted CSI is 44, greater than the quantity of idle bits. In this case, the target CSI needs to be selected from the initially to-be-transmitted CSI and transmitted.

In this embodiment of the present invention, determining may also be referred to as judging, or the like. Similarly, calculation may also be referred to as determination, or the like.

In the scenario described above, regardless of whether the HARQ is directly transmitted or the HARQ is bundled and then transmitted, there may be idle bits. In this case, to avoid a waste of resources, the idle bits may be used to transmit the CSI. The quantity of bits of the initially to-be-transmitted CSI may be greater than the quantity of idle bits, and the target CSI needs to be selected from the to-be-transmitted CSI.

The CSI may be classified into different report types according to content included in the CSI. For example: report type 1: UE-selected subband CQI feedback is supported; report type 1a: subband CQI feedback and second PMI feedback are supported; report type 2, 2b, and 2c: wideband CQI feedback and PMI feedback are supported; report type 2a: wideband PMI feedback is supported; report type 3: RI feedback is supported; report type 4: wideband CQI feedback is supported; report type 5: RI feedback and wideband PMI feedback are supported; and report type 6: RI feedback and PTI feedback are supported. Different report types have different priorities. Different PUCCH report types are classified into two groups as follows according to different priorities:

Group 1:

Report type group A: includes the report types 3, 5, 6, and 2a, which are high priorities; and report type group B: includes the report types 1, 1a, 2, 2b, 2c, and 4, which are low priorities.

The priorities of the report type group B in group 1 may further be divided, for example, group 2:

Report type group C: includes the report types 2, 2b, 2c, and 4, which are high priorities; and report type group D: includes the report types 1 and 1a, which are low priorities.

Therefore, in this embodiment of the present invention, when the target CSI is selected from the to-be-transmitted CSI, optionally, the following manner may be used:

determining a report type corresponding to each piece of CSI in the to-be-transmitted CSI;

determining a priority of each piece of CSI according to a priority of the corresponding report type; and using the first N pieces of CSI of the CSI sorted by priority as the target CSI, where a sum of a quantity of bits of the first N pieces of CSI is less than or equal to the first difference, and a sum of a quantity of bits of the first N+1 pieces of CSI is greater than the first difference.

That is, all pieces of CSI are sorted according to the priority of the corresponding report type. CSI of the highest priority is first selected, then CSI of the second highest priority is selected, and so on. A quantity of bits of all the selected pieces of CSI is calculated. When the quantity of bits of all the selected pieces of CSI is greater than the first difference, selection stops and all the previously selected pieces of CSI are used as the target CSI.

For example, the target CSI is selected from a first piece of CSI, a second piece of CSI, and a third piece of CSI that are to be transmitted. A report type corresponding to the first piece of CSI is the report type 3, a report type corresponding to the second piece of CSI is the report type 2, and a report type corresponding to the third piece of CSI is the report type 1. A priority of the report type 3 is higher than a priority of the report type 2, and the priority of the report type 2 is higher than a priority of the report type 1. Therefore, the priorities of the three pieces of CSI in descending order are as follows: A priority of the first piece of CSI is higher than a priority of the second piece of CSI, and the priority of the second piece of CSI is higher than a priority of the third piece of CSI. When it is determined that a quantity of bits of the first piece of CSI is less than the first difference, it is determined whether a sum of the quantity of bits of the first piece of CSI and a quantity of bits of the second piece of CSI is less than the first difference. If the sum of the quantity of bits of the first piece of CSI and the quantity of bits of the second piece of CSI is less than the first difference, the first piece of CSI and the second piece of CSI are used as the target CSI. If the sum of the quantity of bits of the first piece of CSI and the quantity of bits of the second piece of CSI is greater than or equal to the first difference, the first piece of CSI as is used as the target CSI. It should be noted that each piece of CSI herein is a piece of CSI corresponding to one CC instead of one CSI parameter included in the CSI. For example, the first piece of CSI is a piece of CSI corresponding to a third CC instead of a CQI included in the CSI of the third CC.

The foregoing is described by using an example in which the to-be-transmitted CSI includes three pieces of CSI. Certainly, in actual application, the to-be-transmitted CSI may include at least three pieces of CS. A process of determining the target CSI is similar and details are not described again herein.

In the foregoing description, the target CSI is directly determined according to the priority of the corresponding report type. That is, report types corresponding to different pieces of CSI included in the to-be-transmitted CSI have different priorities. Certainly, the report types corresponding to different pieces of CSI included in the to-be-transmitted CSI may have a same priority. In this case, the priority of the CSI may be determined according to a priority of a CC corresponding to the CSI.

Therefore, in the embodiment of the present invention, when the priority of each piece of CSI is determined according to the priority of the corresponding report type, optionally, the following manner may be used:

if any two pieces of CSI in the to-be-transmitted CSI have a same priority in corresponding report types, determining priorities corresponding to the any two pieces of CSI according to a preset rule, or determining priorities corresponding to the any two pieces of CSI according to priorities of component carriers CC respectively corresponding to the any two pieces of CSI.

For example, the target CSI is selected from a first piece of CSI, a second piece of CSI, a third piece of CSI, a fourth piece of CSI, and a fifth piece of CSI that are to be transmitted. A report type corresponding to the first piece of CSI is the report type 3, a report type corresponding to the second piece of CSI is the report type 2, a report type corresponding to the third piece of CSI is the report type 1, a report type corresponding to the fourth piece of CSI is the report type 5, and a report type corresponding to the fifth piece of CSI is the report type 6. The report type 5, the report type 6, and the report type 3 have a same priority, a priority of report type 3 is higher than a priority of report type 2, and the priority of the report type 2 is higher than a priority of the report type 1. Therefore, according to the priority of the report type corresponding to the CSI, the initially obtained priorities of the five pieces of CSI are as follows: The first piece of CSI, the fourth piece of CSI, and the fifth piece of CSI have a same priority, their priorities are all higher than a priority of the second piece of CSI, and the priority of the second piece of CSI is higher than a priority of the third piece of CSI. For the first piece of CSI, the fourth piece of CSI, and the fifth piece of CSI, their priorities may be determined according to a priority of a corresponding CC.

In this embodiment of the present invention, a manner of determining the priority of the CC may be selected. The priority of the CC may be determined according to an identification number of the CC. Each CC in the CA technology has an identification number. It may be specified that a CC with a smaller identification number has a higher priority. For example, if identification numbers of CCs corresponding to the first piece of CSI, the fourth piece of CSI, and the fifth piece of CSI are 3, 0, and 5 respectively, according to a rule that a CC with a smaller identification number has a higher priority, the fourth piece of CSI has the highest priority, the first piece of CSI has the second highest priority, the fifth piece of CSI has the lowest priority. That is, the priority of the fourth piece of CSI is higher than the priority of the first piece of CSI, and the priority of the first piece of CSI is higher than the priority of the fifth piece of CSI.

In this embodiment of the present invention, the method further includes:

receiving a target CC selection instruction, and determining a target CC according to the target CC selection instruction.

In this case, when the report type corresponding to each piece of CSI is determined in the to-be-transmitted CSI, optionally, the following manner may be used:

determining a report type corresponding to each piece of CSI in the target CC.

For example, the target CSI is selected from a first piece of CSI, a second piece of CSI, a third piece of CSI, a fourth piece of CSI, and a fifth piece of CSI that are to be transmitted. The first piece of CSI, the second piece of CSI, the third piece of CSI, the fourth piece of CSI, and the fifth piece of CSI respectively correspond to a first CC, a second CC, a third CC, a fourth CC, and a fifth CC. After a target CC selection instruction is received, the first CC, the third CC, and the fifth CC are determined as a target CC according to the target CC selection instruction. In this case, report types corresponding to the first, third, and fifth piece of CSI in the first, third, and fifth CC respectively are determined.

In this embodiment of the present invention, when the target CC selection instruction is received, the following manner may be used:

receiving the target CC selection instruction by means of higher layer signaling; or receiving the target CC selection instruction by means of RRC signaling; or receiving the target CC selection instruction by means of DCI.

In the foregoing description, the first quantity of bits is less than or greater than the threshold. In actual application, the first quantity of bits may be equal to the threshold. In this case, the HARQ may be directly transmitted and the second quantity of bits does not need to be determined.

It should be noted that, considering flexibility of implementation, the terminal does not need to execute this embodiment of the present invention each time the terminal transmits UCI. For example, the terminal may determine, according to an indication from the base station, whether to execute the solution provided by the present invention or the conventional-art solution. Specifically, the indication may be implemented by using an indication bit in the indication sent by the base station. In this case, when the indication bit in the indication received by the terminal is 0 and it is determined that the sum of the first quantity of bits and the second quantity of bits is greater than the threshold, the HARQ is directly transmitted. When the indication bit in the indication received by the terminal is 1 and it is determined that the sum of the first quantity of bits and the second quantity of bits is greater than the threshold, the HARQ is not directly transmitted and another condition needs to be determined. When another condition is met, the HARQ is directly transmitted. If another condition is not met, the terminal performs HARQ spatial bundling and transmits the spatially bundled HARQ.

In this solution, when it is determined that the first quantity of bits of the to-be-transmitted HARQ is less than the threshold, the second quantity of bits of the to-be-transmitted CSI is determined. When it is determined that the sum of the first quantity of bits and the second quantity of bits is greater than the threshold, the HARQ is transmitted. In this solution, the HARQ is directly transmitted when the sum of the first quantity of bits and the second quantity of bits is greater than the threshold. Therefore, a disadvantage of a low downlink throughput can be avoided.

Figure 2A:
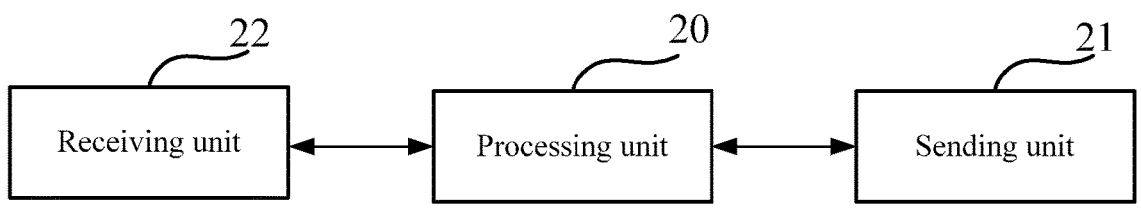
FIG. 2A is a schematic diagram for transmitting UCI according to an embodiment of the present invention.

Referring to FIG. 2A, an embodiment of the present invention provides an apparatus for transmitting UCI. The apparatus includes a processing unit 20 and a sending unit 21.

The processing unit 20 is configured to determine a first quantity of bits of a to-be-transmitted hybrid automatic repeat request HARQ.

The processing unit 20 is further configured to determine whether the first quantity of bits is less than a threshold, and a sum of the first quantity of bits and a second quantity of bits is greater than the threshold.

The sending unit 21 is configured to transmit the HARQ when the processing unit 20 determines that the first quantity of bits is less than the threshold and the sum of the first quantity of bits and the second quantity of bits is greater than the threshold. The second quantity of bits is a quantity of bits of to-be-transmitted CSI.

Further, the processing unit 20 is further configured to:

calculate a first difference by subtracting the first quantity of bits from the threshold; and determine whether the first difference is less than the second quantity of bits, and if the first difference is less than the second quantity of bits, select target CSI from the to-be-transmitted CSI.

The sending unit 21 is further configured to send the target CSI when the processing unit 20 determines that the first difference is less than the second quantity of bits; or send the to-be-transmitted CSI when the processing unit 20 determines that the first difference is greater than or equal to the second quantity of bits.

Further, the processing unit 20 is further configured to:

when it is determined that the first quantity of bits is greater than the threshold, perform spatial bundling on the HARQ;

determine a third quantity of bits of the spatially bundled HARQ;

when it is determined that the third quantity of bits is less than the threshold, calculate a second difference by subtracting the third quantity of bits from the threshold; and determine whether the second difference is less than the second quantity of bits, and if the second difference is less than the second quantity of bits, select target CSI from the to-be-transmitted CSI, where the second quantity of bits is the quantity of bits of the to-be-transmitted CSI.

The sending unit 21 is further configured to send the target CSI when the processing unit 20 determines that the second difference is less than the second quantity of bits; or send the to-be-transmitted CSI when the processing unit 20 determines that the second difference is greater than or equal to the second quantity of bits.

Optionally, that the processing unit 20 selects target CSI from the to-be-transmitted CSI is:

determine a report type corresponding to each piece of CSI in the to-be-transmitted CSI;

determine a priority of each piece of CSI according to a priority of the corresponding report type; and use the first N pieces of CSI of the CSI sorted by priority as the target CSI, where a sum of a quantity of bits of the first N pieces of CSI is less than or equal to the first difference, and a sum of a quantity of bits of the first N+1 pieces of CSI is greater than the first difference.

Optionally, that the processing unit 20 determines a priority of each piece of CSI according to a priority of the corresponding report type is:

if any two pieces of CSI in the to-be-transmitted CSI have a same priority in corresponding report types, determine priorities corresponding to the any two pieces of CSI according to a preset rule, or determine priorities corresponding to the any two pieces of CSI according to priorities of component carriers CC respectively corresponding to the any two pieces of CSI.

Further, the apparatus further includes a receiving unit 22, configured to receive a target CC selection instruction.

The processing unit 20 is further configured to determine a target CC according to the target CC selection instruction.

That the processing unit 20 determines a report type corresponding to each piece of CSI in the to-be-transmitted CSI is:

determine a report type corresponding to each piece of CSI in the target CC.

Figure 2B:
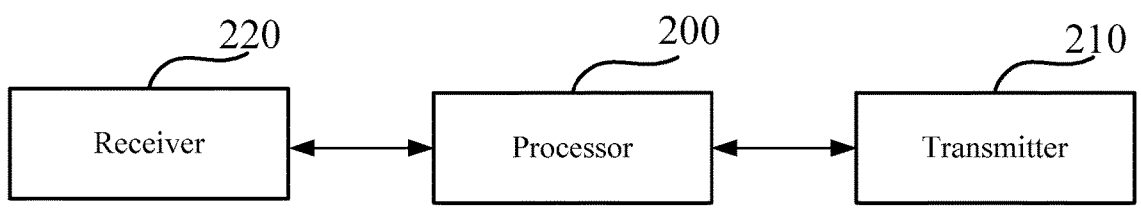
FIG. 2B is another schematic diagram for transmitting UCI according to an embodiment of the present invention.

Referring to FIG. 2B, an embodiment of the present invention provides an apparatus for transmitting UCI. The apparatus includes a processor 200 and a transmitter 210.

The processor 200 is configured to determine a first quantity of bits of a to-be-transmitted hybrid automatic repeat request HARQ.

The processor 200 is further configured to determine whether the first quantity of bits is less than a threshold, and a sum of the first quantity of bits and a second quantity of bits is greater than the threshold.

The transmitter 210 is configured to transmit the HARQ when the processor 200 determines that the first quantity of bits is less than the threshold and the sum of the first quantity of bits and the second quantity of bits is greater than the threshold. The second quantity of bits is a quantity of bits of to-be-transmitted CSI.

It should be noted that, the processor 200 in this embodiment of the present invention is further configured to perform other operations performed by the processing unit 20 shown in FIG. 2A, and the transmitter 210 is further configured to perform other operations performed by the sending unit 21 shown in FIG. 2A. The apparatus further includes a receiver 220, configured to perform the operations performed by the receiving unit 22 shown in FIG. 2A.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

Although some embodiments of the present invention have been described, a person skilled in the art can make changes and modifications to these embodiments once they learn the basic inventive concept. Therefore, the following claims are intended to be construed as to cover the embodiments and all changes and modifications falling within the scope of the present invention.

Obviously, a person skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for transmitting uplink control information (UCI) comprising:
when a sum of a first quantity of bits and a second quantity of bits is greater than a threshold, selecting target channel state information (CSI) from to-be-transmitted CSI, including determining a report type associated with each piece of CSI in the to-be-transmitted CSI and determining a priority of said each piece of CSI according to a priority of the associated report type,
wherein a first N pieces of the CSI in the to-be-transmitted CSI, sorted by priority, are selected as the target CSI, where N is an integer, and
wherein a sum of a quantity of bits of the first N pieces of CSI is less than or equal to a difference between a threshold and the first quantity of bits, and a sum of a quantity of bits of the first N+1 pieces of CSI is greater than the difference; and
transmitting a hybrid automatic repeat request (HARQ) feedback and the target CSI, wherein the first quantity of bits is a quantity of bits of the HARQ feedback, and the second quantity of bits is a quantity of bits of the to-be-transmitted CSI.

2. The method according to claim 1, further comprising:
when the sum of the first quantity of bits and the second quantity of bits is less than or equal to the threshold, transmitting the HARQ and the to-be-transmitted CSI.

3. The method according to claim 1, wherein determining the priority of each piece of CSI according to the priority of the associated report type comprises:

if any two pieces of CSI in the to-be-transmitted CSI have a same priority in associated report types, determine priorities associated with the any two pieces of CSI according to a preset rule.

4. The method according to claim 1, wherein determining the priority of each piece of CSI according to the priority of the associated report type comprises:
if any two pieces of CSI in the to-be-transmitted CSI have a same priority in associated report types, determine priorities associated with the any two pieces of CSI according to priorities of component carriers (CC) respectively associated with the any two pieces of CSI.

5. The method according to claim 4, further comprising:
receiving a target CC selection instruction, and determining a target CC according to the target CC selection instruction; and
wherein determining the report type associated with each piece of CSI in the to-be-transmitted CSI comprises:
determining a report type associated with each piece of CSI in the target CC.

6. The method according to claim 1, further comprising:
performing spatial bundling on the HARQ feedback, wherein the first quantity of bits is a quantity of bits of the HARQ feedback after the spatial bundling.

7. An apparatus for transmitting uplink control information (UCI) comprising:
a processor; and
a non-transitory computer-readable storage medium storing a program to be executed by the processor, the program including instructions for:
selecting target channel state information (CSI) from to-be-transmitted CSI when a sum of a first quantity of bits and a second quantity of bits is greater than a threshold, including determining a report type associated with each piece of CSI in the to-be-transmitted CSI and determining a priority of each piece of CSI according to a priority of the associated report type,
wherein a first N pieces of the CSI in the to-be-transmitted CSI, sorted by priority, are selected as the target CSI, where N is a positive integer, and
wherein a sum of a quantity of bits of the first N pieces of CSI is less than or equal to a difference between the threshold and the first quantity of bits and a sum of a quantity of bits of the first N+1 pieces of CSI is greater than the difference; and
transmitting a hybrid automatic repeat request (HARQ) feedback and the target CSI, wherein the first quantity of bits is a quantity of bits of the HARQ feedback, and the second quantity of bits is a quantity of bits of the to-be-transmitted CSI.

8. The apparatus according to claim 7, wherein the program further includes instructions for transmitting the HARQ and the to-be-transmitted CSI when the sum of the first quantity of bits and the second quantity of bits is less than or equal to the threshold.

9. The apparatus according to claim 7, wherein the instructions for determining the priority of each piece of CSI according to the priority of the associated report type comprises:
if any two pieces of CSI in the to-be-transmitted CSI have a same priority in associated report types, determining priorities associated with the any two pieces of CSI according to a preset rule.

10. The method according to claim 7, wherein the instructions for determining the priority of each piece of CSI according to the priority of the associated report type comprises:
if any two pieces of CSI in the to-be-transmitted CSI have a same priority in associated report types, determining priorities associated with the any two pieces of CSI according to priorities of component carriers (CC) respectively associated with the any two pieces of CSI.

11. The apparatus according to claim 10, wherein
the program further comprises instructions for: receiving a target CC selection instruction, and determining a target CC according to the target CC selection instruction; and
the instructions for determining the report type associated with each piece of CSI in the to-be-transmitted CSI comprises: determining a report type associated with each piece of CSI in the target CC.

12. The apparatus according to claim 7, wherein the program further comprises instructions for:
performing spatial bundling on the HARQ feedback, wherein the first quantity of bits is a quantity of bits of the HARQ feedback after the spatial bundling.

13. A method for transmitting uplink control information (UCI) comprising:
receiving a hybrid automatic repeat request (HARQ) feedback and target channel state information (CSI) selected from to-be-transmitted CSI,
wherein when a sum of a first quantity of bits and a second quantity of bits is greater than a threshold, and the first quantity of bits is a quantity of bits of the HARQ feedback, and the second quantity of bits is a quantity of bits of the to-be-transmitted CSI;
wherein the target CSI is a first N pieces of CSI in the to-be-transmitted CSI, sorted by priority, where N is a positive integer, and
wherein a sum of a quantity of bits of the first N pieces of CSI is less than or equal to a difference between a threshold and the first quantity of bits, and a sum of a quantity of bits of the first N+1 pieces of CSI is greater than the difference.

14. The method according to claim 13, wherein when the sum of the first quantity of bits and the second quantity of bits is less than or equal to the threshold, the CSI is the to-be-transmitted CSI.

15. The method according to claim 13, wherein the first quantity of bits is a quantity of bits of the HARQ feedback after a spatial bundling.

16. An apparatus for transmitting uplink control information (UCI) comprising:
a processor; and
a non-transitory computer-readable storage medium storing a program to be executed by the processor, the program including instructions for:
receiving a hybrid automatic repeat request (HARQ) feedback and target channel state information (CSI) selected from to-be-transmitted CSI,
wherein when a sum of a first quantity of bits and a second quantity of bits is greater than a threshold, and the first quantity of bits is a quantity of bits of the HARQ feedback, and the second quantity of bits is a quantity of bits of the to-be-transmitted CSI;
wherein the target CSI is a first N pieces of CSI in the to-be-transmitted CSI, sorted by priority, where N is a positive integer, and
wherein a sum of a quantity of bits of the first N pieces of CSI is less than or equal to a difference between the threshold and the first quantity of bits, and a sum of a quantity of bits of the first N+1 pieces of CSI is greater than the difference.

17. The apparatus according to claim 16, wherein when the sum of the first quantity of bits and the second quantity of bits is less than or equal to the threshold, the CSI is the to-be-transmitted CSI.

18. The apparatus according to claim 16, wherein the first quantity of bits is a quantity of bits of the HARQ feedback after a spatial bundling.

\* \* \* \* \*